US009403156B2

(12) United States Patent
Narula et al.

(10) Patent No.: US 9,403,156 B2
(45) Date of Patent: *Aug. 2, 2016

(54) ZEOLITE-BASED SCR CATALYSTS AND THEIR USE IN DIESEL ENGINE EMISSION TREATMENT (71) Applicant: UT-Battelle, LLC, Oak Ridge, TN (US)

(72) Inventors: Chaitanya K. Narula, Knoxville, TN (US); Xiaofan Yang, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/662,946

(22) Filed: Mar. 19, 2015

(65) Prior Publication Data
US 2015/0238944 A1 Aug. 27, 2015

Related U.S. Application Data (63) Continuation of application No. 12/855,794, filed on Aug. 13, 2010, now Pat. No. 8,987,161.

(51) Int. Cl.
B01J 29/06 (2006.01)
B01J 29/46 (2006.01)
B01J 29/40 (2006.01)
C01B 39/02 (2006.01)
C01B 39/06 (2006.01)
C01B 39/36 (2006.01)
B01D 53/94 (2006.01)
B01J 23/825 (2006.01)
B01J 23/83 (2006.01)
B01J 37/00 (2006.01)
B01J 37/02 (2006.01)
B01J 37/08 (2006.01)

(52) U.S. Cl.
CPC ............ B01J 29/46 (2013.01); B01D 53/9418 (2013.01); B01J 23/825 (2013.01); B01J 23/83 (2013.01); B01J 29/405 (2013.01); B01J 37/009 (2013.01); B01J 37/0203 (2013.01); B01J 37/088 (2013.01); C01B 39/02 (2013.01); C01B 39/026 (2013.01); C01B 39/06 (2013.01); C01B 39/36 (2013.01); B01D 2255/206 (2013.01); B01D 2255/207 (2013.01); B01D 2255/209 (2013.01); B01D 2255/2063 (2013.01); B01D 2255/20738 (2013.01); B01D 2255/20761 (2013.01); B01D 2255/504 (2013.01); B01D 2258/012 (2013.01); B01J 2229/186 (2013.01); Y02T 10/24 (2013.01)

(58) Field of Classification Search
USPC .......... 502/73, 74, 77; 423/700; 422/177, 180
See application file for complete search history.

(56) References Cited

U.S. PATENT DOCUMENTS

| 3,702,886 A | 11/1972 | Argauer et al. |
| 3,894,107 A | 7/1975 | Butter et al. |
| 3,899,544 A | 8/1975 | Chang et al. |
| 3,928,483 A | 12/1975 | Chang et al. |
| 3,931,349 A | 1/1976 | Kuo |
| 3,969,427 A | 7/1976 | Bell et al. |
| 3,998,899 A | 12/1976 | Daviduk et al. |
| 4,025,571 A | 5/1977 | Lago |
| 4,035,430 A | 7/1977 | Dwyer et al. |
| 4,058,576 A | 11/1977 | Chang et al. |
| 4,071,573 A | 1/1978 | Owen et al. |
| 4,138,440 A | 2/1979 | Chang et al. |
| 4,148,835 A | 4/1979 | Chen et al. |
| 4,278,565 A | 7/1981 | Chen et al. |
| 4,338,475 A | 7/1982 | Pennington et al. |
| 4,404,414 A | 9/1983 | Penick et al. |
| 4,423,274 A | 12/1983 | Daviduk et al. |
| 4,427,789 A | 1/1984 | Miale et al. |
| 4,499,327 A | 2/1985 | Kaiser |
| 4,524,234 A | 6/1985 | Kaiser |
| 4,596,704 A | 6/1986 | Miale et al. |
| 4,788,042 A | 11/1988 | Marsh et al. |
| 4,788,369 A | 11/1988 | Marsh et al. |
| 4,861,937 A | 8/1989 | Baacke et al. |
| 4,961,917 A | 10/1990 | Byrne |

(Continued)

FOREIGN PATENT DOCUMENTS

| EP | 0 099 650 A1 | 2/1984 |
| EP | 0 130 368 A1 | 1/1985 |

(Continued)

OTHER PUBLICATIONS

Ansell G.P., "The Development of a Model Capable of Predicting Diesel Lean $NO_x$ Catalyst Performance Under Transient Conditions", *Applied Catalysis B: Environmental* 10:183-201 (1996).

(Continued)

Primary Examiner — Elizabeth Wood
(74) Attorney, Agent, or Firm — Scully, Scott, Murphy & Presser, P.C.

(57) ABSTRACT

A catalyst comprising a zeolite loaded with copper ions and at least one trivalent metal ion other than $Al^{+3}$, wherein the catalyst decreases $NO_x$ emissions in diesel exhaust. The trivalent metal ions are selected from, for example, trivalent transition metal ions, trivalent main group metal ions, and/or trivalent lanthanide metal ions. In particular embodiments, the catalysts are selected from Cu—Fe-ZSM5, Cu—La-ZSM-5, Fe—Cu—La-ZSM5, Cu—Sc-ZSM-5, and Cu—In-ZSM5. The catalysts are placed on refractory support materials and incorporated into catalytic converters.

37 Claims, 6 Drawing Sheets

(56) References Cited

U.S. PATENT DOCUMENTS

| | | | |
|---|---|---|---|
| 5,041,690 | A | 8/1991 | Harandi et al. |
| 5,045,287 | A | 9/1991 | Harandi et al. |
| 5,177,279 | A | 1/1993 | Harandi |
| 5,314,665 | A | 5/1994 | Iwasa |
| 5,516,497 | A | 5/1996 | Speronello et al. |
| 6,314,722 | B1 | 11/2001 | Matros et al. |
| 6,323,383 | B1 | 11/2001 | Tsuchida et al. |
| 6,471,923 | B1 | 10/2002 | Becue et al. |
| 6,616,904 | B1 | 9/2003 | Becue et al. |
| 6,703,343 | B2 | 3/2004 | Park |
| 6,713,030 | B1 | 3/2004 | Chandler et al. |
| 6,843,971 | B2 | 1/2005 | Schäfer-Sindlinger et al. |
| 6,919,052 | B2 | 7/2005 | Foster et al. |
| 6,994,830 | B1 | 2/2006 | Raybone et al. |
| 7,005,116 | B2 | 2/2006 | Schäfer-Sindlinger et al. |
| 7,049,261 | B2 | 5/2006 | Nam et al. |
| 7,081,231 | B1 | 7/2006 | Aardahl et al. |
| 7,288,230 | B2 | 10/2007 | Grandlund et al. |
| 7,412,824 | B1 | 8/2008 | Newburry et al. |
| 7,429,621 | B2 | 9/2008 | Miller et al. |
| 7,438,868 | B2 | 10/2008 | Kato |
| 7,442,425 | B2 | 10/2008 | Fu et al. |
| 7,459,413 | B2 | 12/2008 | Shen et al. |
| 7,575,727 | B2 | 8/2009 | Fukushima |
| 7,678,348 | B2 | 3/2010 | Han et al. |
| 7,691,340 | B2 | 4/2010 | Sinha et al. |
| 7,998,443 | B2 | 8/2011 | Andersen et al. |
| 8,987,161 | B2 * | 3/2015 | Narula ............... B01D 53/9418 422/177 |
| 2005/0069476 | A1 | 3/2005 | Blakeman et al. |
| 2005/0101473 | A1 | 5/2005 | Marshall et al. |
| 2007/0269353 | A1 | 11/2007 | Li et al. |
| 2008/0166282 | A1 | 7/2008 | Golden et al. |
| 2008/0167178 | A1 | 7/2008 | Malyala et al. |
| 2008/0226545 | A1 | 9/2008 | Bull et al. |
| 2008/0241060 | A1 | 10/2008 | Li et al. |
| 2008/0274876 | A1 | 11/2008 | Ott |
| 2008/0292519 | A1 | 11/2008 | Caudle et al. |
| 2009/0048095 | A1 | 2/2009 | Li et al. |
| 2009/0196812 | A1 | 8/2009 | Bull et al. |
| 2009/0260346 | A1 | 10/2009 | Gekas et al. |
| 2009/0274602 | A1 | 11/2009 | Alward et al. |
| 2009/0304566 | A1 | 12/2009 | Golden et al. |
| 2010/0092361 | A1 | 4/2010 | Li et al. |
| 2011/0152513 | A1 | 6/2011 | Yao et al. |
| 2011/0305614 | A1 | 12/2011 | Stiebels et al. |
| 2012/0039759 | A1 | 2/2012 | Narula et al. |

FOREIGN PATENT DOCUMENTS

| | | |
|---|---|---|
| WO | WO 90/12855 A1 | 11/1990 |
| WO | WO 03/009918 A1 | 2/2003 |
| WO | WO 2008/132452 A2 | 11/2008 |

OTHER PUBLICATIONS

Dossi C. et al., "Cu—ZSM-5 (Si/Al=66), Cu—Fe—S—1 (Si/Fe=66) and Cu—S—1 Catalysts for NO Decomposition: Preparation, Analytical Characterization and Catalytic Activity", *Microporous and Mesoporous Materials* 30:165-175 (1999).

Shen W.J., Fuel and Energy Abstracts, vol. 37, issue 3, May 1996, p. 180.

Urquieta-González E.A. et al., "Identification of Extra-Framework Species on Fe/ZSM-5 and Cu/ZSM-5 Catalysts Typical Microporous Molecular Sieves with Zeolitic Structure", *Materials Research* 5(3):321-327 (2002).

Wusirika R. et al., "Extruded Zeolite Catalysts for Lean Exhaust Application", *SAE International* pp. 1-11 (2005).

* cited by examiner

ZEOLITE-BASED SCR CATALYSTS AND THEIR USE IN DIESEL ENGINE EMISSION TREATMENT

CROSS REFERENCE TO RELATED APPLICATIONS

This application is a continuation of U.S. application Ser. No. 12/855,794 filed on Aug. 13, 2010, the contents of which are incorporated herein by reference in their entirety.

This invention was made with government support under Contract Number DE-AC05-00OR22725 between the United States Department of Energy and UT-Battelle, LLC. The U.S. government has certain rights in this invention.

FIELD OF THE INVENTION

The present invention relates to the field of emissions processing catalysts, and particularly, to zeolite-based catalysts used in treating diesel engine emissions.

BACKGROUND OF THE INVENTION

Diesel engines are known to be significantly more fuel efficient than their gasoline counterparts. Therefore, the introduction of diesel engine off-road systems (e.g., industrial or household equipment, such as heavy machinery and lawnmowers) is highly desirable.

The high fuel efficiency of diesel engines results in oxygen-rich (i.e., "lean") exhaust that also contains $NO_x$ gases. Although $NO_x$ gases can be efficiently removed from oxygen-poor exhausts, as produced in gasoline engine emissions, the removal of $NO_x$ gases in diesel engine lean emissions continues to be a significant challenge. In particular, the standard three-way catalyst works well for gasoline engines but does not meet EPA regulatory requirements when used for diesel engines.

In order to meet EPA regulatory requirements for diesel engines, extensive efforts are under way to find catalysts that can effectively treat $NO_x$ in the oxygen-rich emissions emitted by diesel engines. The leading approach for reduction of $NO_x$ in diesel emissions is selective catalytic reduction (SCR). In SCR, ammonia or urea is often employed as a reductant. The best known $NH_3$-SCR catalysts for $NO_x$ reduction under the lean environment of diesel engine emissions are Cu-ZSM-5 and Fe-ZSM-5. These have been shown to function effectively only within narrow temperature ranges. Cu-ZSM-5 generally exhibits a better $NO_x$ reduction activity at lower temperatures while Fe-ZSM-5 exhibits better activity at higher temperatures. Thus, a combination of Cu-ZSM-5 and Fe-ZSM-5 zeolites (i.e., as a heterogeneous mixture) has been used in an effort to effectively treat $NO_x$ within a broadened temperature range.

Although the Cu/Fe heterogeneous system provides an improvement in emissions processing for diesel-operated passenger vehicles, the Cu/Fe heterogeneous system is significantly inadequate when applied to off-road diesel engine systems. In particular, the catalysts currently employed do not efficiently reduce $NO_x$ emissions at low temperatures, such as 150-200° C., which is more critical in off-road diesel engines than in passenger vehicles. Moreover, the Cu/Fe heterogeneous system may be adequately efficient only within separate narrow temperature ranges, e.g., a high and a low temperature range. However, particularly for off-road diesel engines that can operate under a broad range of temperatures, there would be a significant benefit in a catalyst that can operate efficiently under a wide range of temperatures (e.g., from 150° C. to 650° C.).

SUMMARY OF THE INVENTION

In a first aspect, the invention is directed to a catalyst for treating diesel engine exhaust. The catalyst is specially formulated to decrease $NO_x$ emissions in diesel exhaust while operating with greater efficiency, particularly at lower temperatures below 200° C., or from about 150 to about 200° C. In other embodiments, the catalyst is specially formulated to decrease $NO_x$ emissions in diesel exhaust while operating with greater efficiency, particularly at higher temperatures greater than 600° C., or from about 575 to about 650° C. In particular embodiments, the catalyst includes a zeolite loaded with copper ions and at least one trivalent metal ion. The at least one trivalent metal ion can be, for example, one, two, or three types of trivalent metal ions selected from transition metal, main group metal, and lanthanide metal ions.

In another aspect, the invention is directed to a catalytic converter including therein the catalyst described above loaded onto a refractory support material (substrate). In particular embodiments, the refractory support material is a honeycomb structure. The catalyst-loaded refractory support material is typically housed in a refractory encasing.

DETAILED DESCRIPTION OF THE INVENTION

In one aspect, the invention is directed to a catalyst for mitigating (i.e., removing or reducing) $NO_x$ emissions from diesel exhaust. The catalyst includes a zeolite loaded with copper ions and at least one trivalent metal ion.

The zeolite considered herein can be any of the porous aluminosilicate structures known in the art that are stable under high temperature conditions, i.e., of at least 100° C., 150° C., 200° C., 250° C., 300° C., and higher temperatures up to, for example, 500° C., 550° C., 600° C., 650° C., 700° C., 750° C., 800° C., 850° C., or 900° C. In particular embodiments, the zeolite is stable from at least 100° C. and up to 700° C. Typically, the zeolite is ordered by having a crystalline or partly crystalline structure. The zeolite can generally be described as a three-dimensional framework containing silicate ($SiO_2$ or $SiO_4$) and aluminate ($Al_2O_3$ or $AlO_4$) units that are interconnected (i.e., crosslinked) by the sharing of oxygen atoms.

The zeolite can be microporous (i.e., pore size of less than 2 μm), mesoporous (i.e., pore size within 2-50 μm, or subrange therein), or a combination thereof. In several embodiments, the zeolite material is completely or substantially microporous. By being completely or substantially microporous, the pore volume due to micropores can be, for example, 100%, or at least 95%, 96%, 97%, 98%, 99%, or 99.5%, with the remaining pore volume being due to mesopores, or in some embodiments, macropores (pore size greater than 50 μm). In other embodiments, the zeolite material is completely or substantially mesoporous. By being completely or substantially mesoporous, the pore volume due to mesopores can be, for example, 100%, or at least 95%, 96%, 97%, 98%, 99%, or 99.5%, with the remaining pore volume being due to micropores, or in some embodiments, macropores. In yet other embodiments, the zeolite material contains an abundance of both micropores and mesopores. By containing an abundance of both micropores and mesopores, the pore volume due to mesopores can be, for example, up to, at least, or precisely 50%, 60%, 70%, 80%, or 90%, with the pore volume balance being due to mesopores, or vice-versa.

In various embodiments, the zeolite is a MFI-type zeolite, MEL-type zeolite, MTW-type zeolite, MCM-type zeolite, BEA-type zeolite, kaolin, or a faujasite-type of zeolite. Some particular examples of zeolites include the ZSM class of zeolites (e.g., ZSM-5, ZSM-8, ZSM-11, ZSM-12, ZSM-15, ZSM-23, ZSM-35, ZSM-38, ZSM-48), zeolite X, zeolite Y, zeolite beta, and the MCM class of zeolites (e.g., MCM-22 and MCM-49). The compositions, structures, and properties of these zeolites are well-known in the art, and have been described in detail, as found in, for example, U.S. Pat. Nos. 4,596,704, 3,702,886, 7,459,413, and 4,427,789, the contents of which are incorporated herein by reference in their entirety.

The zeolite can have any suitable silica-to-alumina (i.e., $SiO_2/Al_2O_3$ or "Si/Al") ratio. For example, in various embodiments, the zeolite can have a Si/Al ratio of precisely, at least, less than, or up to 1, 2, 3, 4, 5, 6, 7, 8, 9, 10, 11, 12, 13, 14, 15, 20, 25, 30, 35, 40, 45, 50, 55, 60, 65, 70, 75, 80, 85, 90, 95, 100, 120, 150, or 200, or a Si/Al ratio within a range bounded by any two of the foregoing values. In particular embodiments, the zeolite possesses a Si/Al ratio of 1 to 45.

In particular embodiments, the zeolite is ZSM-5. ZSM-5 belongs to the pentasil-containing class of zeolites, all of which are also considered herein. In particular embodiments, the ZSM-5 zeolite is represented by the formula $Na_nAl_nSi_{96-n}O_{192} \cdot 16H_2O$, wherein $0<n<27$.

Typically, the zeolite contains an amount of cationic species. As is well known in the art, the amount of cationic species is generally proportional to the amount of aluminum in the zeolite. This is because the replacement of silicon atoms with lower valent aluminum atoms necessitates the presence of countercations to establish a charge balance. Some examples of cationic species include hydrogen ions ($H^+$), alkali metal ions, alkaline earth metal ions, and main group metal ions. Some examples of alkali metal ions that may be included in the zeolite include lithium ($Li^+$), sodium ($Na^+$), potassium ($K^+$), rubidium ($Rb^+$), and cesium ($Cs^+$). Some examples of alkaline earth metal ions that may be included in the zeolite include ($Be^{2+}$), magnesium ($Mg^{2+}$), calcium ($Ca^{2+}$), strontium ($Sr^{2+}$), and barium ($Ba^{2\pm}$). Some examples of main group metal ions that may be included in the zeolite include boron ($B^{3+}$), gallium ($Ga^{3+}$), indium ($In^{3+}$), and arsenic ($As^{3+}$). In some embodiments, a combination of cationic species is included. The cationic species can be in a trace amount (e.g., no more than 0.01 or 0.001%), or alternatively, in a significant amount (e.g., above 0.01%, and up to, for example, 0.1, 0.5, 1, 2, 3, 4, or 5% by weight of the zeolite).

The zeolite described above is loaded with an amount of copper ions. The copper ions can be cuprous ($Cu^{+1}$) or cupric ($Cu^{+2}$) in nature. The copper loading can be any suitable amount. In different embodiments, the copper loading is precisely, at least, less than, or up to, for example, 0.01%, 0.02%, 0.03%, 0.04%, 0.05%, 0.06%, 0.07%, 0.08%, 0.09%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, or 2.5%, or a copper loading within a range bounded by any two of the foregoing values, wherein the loading is expressed as the amount of metal by weight of the zeolite. In particular embodiments, the copper loading is any value up to 2.5%.

In addition to copper ions, the zeolite catalyst of the instant invention also includes at least one trivalent metal ion. As used herein, the term "trivalent metal ion" is defined as a trivalent metal ion other than aluminum ($Al^{+3}$). Without wishing to be bound by any theory, it is believed that the trivalent metal is incorporated into the zeolite material by replacing an amount of aluminum ions therein. Thus, the incorporated trivalent metal ion is believed to be bound in the zeolite to an appropriate number of oxygen atoms, i.e., as a metal oxide unit in close proximity (e.g., within electronic contact or communication) to the copper ions. The close proximity between the trivalent metal ions and copper ions is believed to cause a combined effect different than the cumulative effect of these ions when they are not in such close proximity. The effect primarily considered herein is the effect on the resulting catalyst's ability to process $NO_x$ gases (i.e., the catalyst's $NO_x$ conversion ability).

In some embodiments, only one type of trivalent metal ion aside from aluminum is incorporated into the zeolite. In other embodiments, at least two types of trivalent metal ions aside from aluminum are incorporated into the zeolite. In yet other embodiments, at least three types of trivalent metal ions aside from aluminum are incorporated into the zeolite. In yet other embodiments, precisely two or precisely three types of trivalent metal ions aside from aluminum are incorporated into the zeolite.

Each of the trivalent metal ions can be included in any suitable amount, such as, precisely, at least, less than, or up to, for example, 0.01%, 0.02%, 0.03%, 0.04%, 0.05%, 0.06%, 0.07%, 0.08%, 0.09%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, or 2.5%, or an amount within a range bounded by any two of the foregoing values. In particular embodiments, each of the trivalent metal ions can be included in an amount of, precisely, at least, less than, or up to 2.5%. In embodiments where more than one type of trivalent metal ion is included, the loading of each metal can be independently selected from any of the above exemplary amounts or ranges therein. In other embodiments, the total amount of trivalent metal ions other than aluminum conforms to any of the exemplary values provided above.

In a first set of embodiments, at least one trivalent metal ion is selected from trivalent transition metal ions. The one or more transition metals can be selected from any or a select portion of the following types of transition metals: elements of Groups IIIB (Sc group), IVB (Ti group), VB (V group), VIB (Cr group), VIIB (Mn group), VIIIB (Fe and Co groups) of the Periodic Table of the Elements. Some examples of trivalent transition metal ions include $Sc^{+3}$, $Y^{+3}$, $V^{+3}$, $Nb^{+3}$, $Cr^{+3}$, $Fe^{+3}$, and $Co^{+3}$. In other embodiments, the trivalent metal ion excludes all transition metal ions, or alternatively, excludes any one, two, or more classes or specific examples of transition metal ions provided above. In particular embodiments, the trivalent transition metal ions include $Sc^{+3}$, or $Fe^{+3}$, or a combination thereof.

In a second set of embodiments, at least one trivalent metal ion is selected from trivalent main group metal ions. The one or more main group metals can be selected from any or a select portion of elements of Group IIIA (B group) and/or Group VA (N group) of the Periodic Table, other than aluminum. Some examples of trivalent main group metal ions include $Ga^{+3}$, $In^{+3}$, $As^{+3}$, $Sb^{+3}$, and $Bi^{+3}$. In other embodiments, the trivalent metal ion excludes all main group metal ions other than aluminum, or alternatively, excludes any one, two, or more classes or specific examples of main group metal ions provided above. In particular embodiments, the trivalent main group metal ions include at least $In^{3+}$.

In a third set of embodiments, at least one trivalent metal ion is selected from trivalent lanthanide metal ions. Some examples of trivalent lanthanide metal ions considered herein include $La^{+3}$, $Ce^{+3}$, $Pr^{+3}$, $Nd^{+3}$, $Sm^{+3}$, $Eu^{+3}$, $Gd^{+3}$, $Tb^{+3}$, $Dy^{+3}$, $Ho^{+3}$, $Er^{+3}$, $Tm^{+3}$, $Yb^{+3}$, and $Lu^{+3}$. In particular embodiments, the trivalent lanthanide metal ion is selected from one or a combination of $La^{+3}$, $Ce^{+3}$, $Pr^{+3}$, and $Nd^{+3}$. In further particular embodiments, the trivalent lanthanide metal ion is or includes $La^{+3}$.

In a fourth set of embodiments, at least two trivalent metal ions are selected from trivalent transition metal ions. Some combinations of trivalent transition metal ions considered herein include $Se^{+3}$ in combination with one or more other trivalent transition metal ions, or $Fe^{+3}$ in combination with one or more other trivalent transition metal ions, or $Y^{+3}$ in combination with one or more other trivalent transition metal ions.

In a fifth set of embodiments, at least two trivalent metal ions are selected from trivalent main group metal ions. Some combinations of trivalent main group metal ions considered herein include $In^{+3}$ in combination with one or more other trivalent main group metal ions, or $Ga^{+3}$ in combination with one or more other trivalent main group metal ions, or $As^{+3}$ in combination with one or more other trivalent main group metal ions.

In a sixth set of embodiments, at least two trivalent metal ions are selected from trivalent lanthanide metal ions. Some combinations of trivalent lanthanide metal ions considered herein include $La^{+3}$ in combination with one or more other trivalent lanthanide metal ions, or $Ce^{+3}$ in combination with one or more other trivalent lanthanide metal ions, or $Pr^{+3}$ in combination with one or more other trivalent lanthanide metal ions, or $Nd^{+3}$ in combination with one or more other trivalent lanthanide metal ions.

In a seventh set of embodiments, at least one trivalent metal ion is a trivalent transition metal ion and at least one trivalent metal ion is a trivalent lanthanide metal ion. For example, in particular embodiments, at least one trivalent metal ion is selected from $Sc^{+3}$, $Fe^{+3}$, and/or $Y^{+3}$, and another trivalent metal ion is selected from $La^{+3}$, $Ce^{+3}$, $Pr^{+3}$, and/or $Nd^{+3}$.

In an eighth set of embodiments, at least one trivalent metal ion is a trivalent transition metal ion and at least one trivalent metal ion is a trivalent main group metal ion. For example, in particular embodiments, at least one trivalent metal ion is selected from $Sc^{+3}$, $Fe^{+3}$, and/or $Y^{+3}$, and another trivalent metal ion is selected from $In^{+3}$, $Ga^{+3}$, and/or $In^{+3}$.

In a ninth set of embodiments, at least one trivalent metal ion is a trivalent main group metal ion and at least one trivalent metal ion is a trivalent lanthanide metal ion. For example, in particular embodiments, at least one trivalent metal ion is selected from $Sc^{+3}$, $Fe^{+3}$, and/or $Y^{+3}$, and another trivalent metal ion is selected from $La^{+3}$, $Ce^{+3}$, $Pr^{+3}$, and/or $Nd^{+3}$.

In a tenth set of embodiments, at least three trivalent metal ions are included in the zeolite. The at least three trivalent metal ions can be selected from trivalent transition metal ions, trivalent main group metal ions, and/or trivalent lanthanide metal ions.

In particular embodiments, one, two, three, or more trivalent metal ions are selected from $Sc^{+3}$, $Fe^{+3}$, $Y^{+3}$, $La^{+3}$, $Ce^{+3}$, $Pr^{+3}$, $Nd^{+3}$, $In^{+3}$, and/or $Ga^{+3}$. In more particular embodiments, one, two, three, or more trivalent metal ions are selected from $Sc^{+3}$, $Fe^{+3}$, $La^{+3}$, and/or $In^{+3}$.

The zeolite catalyst described above is typically not coated with a metal-containing film or layer. However, the instant invention also contemplates the zeolite catalyst described above coated with a metal-containing film or layer as long as the film or layer does not substantially impede the catalyst from effectively functioning as a $NO_x$ reduction catalyst as intended herein. By being coated, the film or layer resides on the surface of the zeolite. In some embodiments, the surface of the zeolite refers to only the outer surface (i.e., as defined by the outer contour area of the zeolite catalyst), while in other embodiments, the surface of the zeolite refers to or includes inner surfaces of the zeolite, such as the surfaces within pores or channels of the zeolite. The metal-containing film or layer can serve, for example, to adjust the physical characteristics of the catalyst, the catalytic efficiency, or catalytic selectivity. Some examples of metal-containing surfaces include the oxides and/or sulfides of the alkali metals, alkaline earth metals, divalent transition or main group metals (e.g., $Zn^{+2}$, $Fe^{+2}$, $Co^{+2}$, $Ni^{+2}$, $Pd^{+2}$, $Pt^{+2}$, $Sn^{+2}$, or $Pb^{+2}$), tetravalent transition metals (e.g., $Ti^{+4}$, $Zr^{+4}$, $Rh^{+4}$, $Ir^{+4}$, $Mn^{+4}$, $Ge^{+4}$, $Sn^{+4}$, and $Te^{+4}$), pentavalent transition or main group metals (e.g., $Nb^{+5}$, $Ta^{+5}$, and $Sb^{+5}$), and hexavalent transition metals (e.g., $Cr^{+6}$, $Mo^{+6}$, and $W^{+6}$). In other embodiments, one or more classes or specific types of any of the above additional metal ions are excluded from the zeolite catalyst.

The catalyst described herein can be synthesized by any suitable method known in the art. The method considered herein should incorporate the metal ions (i.e., copper and one or more trivalent metal ions) homogeneously into the zeolite. The resulting metal-loaded catalyst contains a homogeneous distribution of the metal ions on a molecular level, i.e., the catalyst does not contain macroscopic regions containing only one type of metal ion, as would be obtained by grinding and mixing of two zeolite sources that each contain a different metal ion.

In particular embodiments, the catalyst described herein is prepared by, first, impregnating the zeolite with the metals to be loaded. The impregnating step can be achieved by, for example, treating the zeolite with one or more solutions containing the metals to be loaded. By treating the zeolite with the metal-containing solution, the metal-containing solution is contacted with the zeolite such that the solution is absorbed into the zeolite, preferably into the entire volume of the zeolite.

In one embodiment, the impregnating step is achieved by treating the zeolite with a solution that contains all of the metals to be loaded. In another embodiment, the impregnating step is achieved by treating the zeolite with two or more solutions, wherein the different solutions contain different metals or combinations of metals. Each treatment of the zeolite with an impregnating solution corresponds to a separate impregnating step. Typically, when more than one impregnating step is employed, a drying and/or thermal treatment step is employed between the impregnating steps.

The metal-impregnating solution contains at least one or more metal ions to be loaded into the zeolite, as well as a liquid carrier for distributing the metal ions into the zeolite. The metal ions are generally in the form of metal salts. Preferably, the metal salts are completely dissolved in the liquid carrier. The metal salt contains one or more metal ions in ionic association with one or more counteranions. Any one or more of the metal ions described above can serve as the metal ion portion. The counteranion can be selected from, for example, halides ($F^-$, $Cl^-$, $Br^-$, or $I^-$), carboxylates (e.g., formate, acetate, propionate, or butyrate), sulfate, nitrate, phosphate, chlorate, bromate, iodate, hydroxide, β-diketonate (e.g., acetylacetonate), and dicarboxylates (e.g., oxalate, malonate, or succinate). In some embodiments, the counteranion may contain one or more metals, including one or more metals to be loaded into the zeolite. Some examples of such counteranions include titanate, zirconate, vanadate, niobate, tantalate, chromate, molybdate, tungstate, arsenate, antimonate, stannate, and tellurate. In other embodiments, one or more classes or specific types of any of the foregoing counteranions are excluded from the impregnating solution (or alternatively, excluded from being incorporated into the zeolite).

In particular embodiments, the catalyst is prepared by forming a slurry containing zeolite powder and the metals to be incorporated. The resulting slurry is dried and fired to form a powder. The powder is then combined with organic and/or inorganic binders and wet-mixed to form a paste. The resulting paste can be formed into any desired shape, e.g., by extrusion into rod, honeycomb, or pinwheel structures. The extruded structures are then dried and fired to form the final catalyst. In other embodiments, the zeolite powder, metals, and binders are all combined together to form a paste, which is then extruded and fired.

After impregnating the zeolite, the metal-loaded zeolite is typically dried and/or subjected to a thermal treatment step (e.g., a firing or calcination step). The thermal treatment step functions to permanently incorporate the impregnated metals into the zeolite, e.g., by replacing $Al^{+3}$ and/or $Si^{+4}$ and forming metal-oxide bonds within the zeolite material. In different embodiments, the thermal treatment step can be conducted at a temperature of at least 100° C., 150° C., 200° C., 250° C., 300° C., 350° C., 400° C., 450° C., 500° C., 550° C., 600° C., 650° C., 700° C., 750° C., or 800° C., or within a range therein, for a time period of, for example, 15 minutes, 30 minutes, 1 hour, 2 hours, 6 hours, 12 hours, 24 hours, 30 hours, 36 hours, or 48 hours, or within a range therein. In particular embodiments, the thermal treatment step is conducted at a temperature of at least 500° C. for a time period of at least two hours. In some embodiments, the thermal treatment step includes a temperature ramping step from a lower temperature to a higher temperature, and/or from a higher temperature to a lower temperature. For example, the thermal treatment step can include a ramp stage from 100-700° C., or vice-versa, at a rate of 1, 2, 5, or 10° C./min.

Generally, the one or more heat treatment steps are conducted under normal atmospheric pressure. However, in some embodiments, an elevated pressure (e.g., above 1 atm and up to 2, 5, or 10 atm) is employed, while in other embodiments, a reduced pressure (e.g., below 1, 0.5, or 0.2 atm) is employed. Furthermore, although the heat treatment steps are generally conducted under a normal air atmosphere, in some embodiments, an elevated oxygen, reduced oxygen, or inert atmosphere is used. Some gases that can be included in the processing atmosphere include, for example, oxygen, nitrogen, helium, argon, carbon dioxide, and mixtures thereof.

Generally, the zeolite catalyst described herein is in the form of a powder. In a first set of embodiments, at least a portion, or all, of the particles of the powder have a size less than a micron (i.e., nanosized particles). The nanosized particles can have a particle size of precisely, at least, up to, or less than, for example, 1, 2, 5, 10, 20, 30, 40, 50, 60, 70, 80, 90, 100, 150, 200, 250, 300, 350, 400, 450, 500, 550, 600, 650, 700, 750, 800, 850, 900, or 950 nanometers (nm), or a particle size within a range bounded by any two of the foregoing values. In a second set of embodiments, at least a portion, or all, of the particles of the powder have a size at or above 1 micron in size. The micron-sized particles can have a particle size of precisely, at least, up to, or less than, for example, 1, 2, 5, 10, 20, 30, 40, 50, 60, 70, 80, 90, or 100 microns (μm), or a particle size within a range bounded by any two of the foregoing values. In some embodiments, single crystals or grains of the catalyst correspond to any of the sizes provided above, while in other embodiments, crystals or grains of the catalyst are agglomerated to provide agglomerated crystallites or grains having any of the above exemplary dimensions.

In other embodiments, the zeolite catalyst can be in the form of a film, a coating, or a multiplicity of films or coatings. The thickness of the coatings or multiplicity of coatings can be, for example, 1, 2, 5, 10, 50, or 100 microns, or a range therein, or up to 100 micron thickness. In yet other embodiments, the zeolite catalyst is in the form of a non-particulate (i.e., continuous) bulk solid. In still other embodiments, the zeolite catalyst can be fibrous or in the form of a mesh.

The catalyst can also be mixed with or affixed onto a support material suitable for operation in a catalytic converter. The support material can be a powder (e.g., having any of the above particle sizes), granular (e.g., 0.5 mm or greater particle size), a bulk material, such as a honeycomb monolith of the flow-through type, a plate or multi-plate structure, or corrugated metal sheets. If a honeycomb structure is used, the honeycomb structure can contain any suitable density of cells. For example, the honeycomb structure can contain 100, 200, 300, 400, 500, 600, 700, 800, or 900 cells/in$^2$ (or from 62-140 cells/cm$^2$) or greater. The support material is generally constructed of a refractory composition, such as those containing cordierite, mullite, alumina (e.g., α-, β-, or γ-alumina), or zirconia, or a combination thereof. Honeycomb structures, in particular, are described in detail in, for example, U.S. Pat. Nos. 5,314,665, 7,442,425, and 7,438,868, the contents of which are incorporated herein by reference in their entirety. When corrugated or other types of metal sheets are used, these can be layered on top of each other with catalyst material supported on the sheets such that passages remain that allow the flow of exhaust gas between the sheets. The layered sheets can also be formed into a structure, such as a cylinder, by winding the sheets.

The catalyst described herein preferably exhibits a $NO_x$ conversion temperature profile that is improved over that exhibited by Cu-ZSM5, Fe-ZSM5, or a mixture of Cu-ZSM5 and Fe-ZSM5.

In a first set of embodiments, the catalyst described herein preferably exhibits a high $NO_x$ conversion at 150° C. As used herein, the phrase "high $NO_x$ conversion at 150° C." is defined as a $NO_x$ conversion of at least or above 50%, 55%, 60%, 65%, 70%, 75%, 80%, or 85% at 150° C.

In a second set of embodiments, the catalyst described herein preferably exhibits a high $NO_x$ conversion at 200° C. As used herein, the phrase "high $NO_x$ conversion at 200° C." is defined as a $NO_x$ conversion of at least or above 80%, 85%, or 90% at 200° C.

In a third set of embodiments, the catalyst described herein preferably exhibits a high $NO_x$ conversion at 250-450° C. As used herein, the phrase "high $NO_x$ conversion at 250-450° C."

is defined as a $NO_x$ conversion of at least or above 60%, 65%, 70%, 75%, 80%, 85%, or 90% at 250° C., 300° C., 350° C., 400° C., or 450° C., or across a range bounded by any two of these temperatures.

In a fourth set of embodiments, the catalyst described herein preferably exhibits a high $NO_x$ conversion at 500-525° C. As used herein, the phrase "high $NO_x$ conversion at 500-525° C." is defined as a $NO_x$ conversion of at least or above 60%, 65%, 70%, 75%, 80%, or 85% at 500° C. or 525° C., or across these two temperatures.

In a fifth set of embodiments, the catalyst described herein preferably exhibits a high $NO_x$ conversion at 550° C. As used herein, the phrase "high $NO_x$ conversion at 550° C." is defined as a $NO_x$ conversion of at least or above 60%, 65%, 70%, 75%, or 80% at 550° C.

In a sixth set of embodiments, the catalyst described herein preferably exhibits a high $NO_x$ conversion at 600-650° C. As used herein, the phrase "high $NO_x$ conversion at 600-650° C." is defined as a $NO_x$ conversion of at least or above 60%, 65%, 70%, 75%, or 80% at 600° C., 625° C., or 650° C., or across a range bounded by any two of these temperatures.

In a seventh set of embodiments, the catalyst described herein preferably exhibits a high $NO_x$ conversion at 150° C. while also exhibiting a high $NO_x$ conversion at 200° C., and/or a high $NO_x$ conversion at 250-450° C., and/or a high $NO_x$ conversion at 500-525° C., and/or a high $NO_x$ conversion at 550° C., and/or a high $NO_x$ conversion at 600-650° C.

In another aspect, the invention is directed to a catalytic converter that contains therein as a catalyst the above-described metal-loaded zeolite catalyst. The catalyst is typically disposed on a refractory supporting element, such as corrugated metal sheets or a honeycomb structure, as described above. The catalytic converter can be any of the catalytic converters known in the art, and particularly, those catalytic converters particularly suited for processing diesel fuel exhaust. The construction and operation of such catalytic converters are well known in the art, as described in detail in, for example, U.S. Pat. Nos. 7,691,340, 7,678,348, 7,575,727, 7,442,425, 7,438,868, 7,412,824, 7,288,230, 6,919,052, and 5,314,665, the contents of which are all herein incorporated by reference in their entirety.

As basic elements, the catalytic converter typically contains the catalyst disposed on a supporting element such that passages are made available for exhaust to pass therethrough, and the supported catalyst enclosed in a metal casing. The metal casing is generally connected with one or more inlets (i.e., pipes) for transferring exhaust gases into the supported catalyst. The metal casing may also include one or more gaskets.

In particular embodiments, the catalytic converter is connected with a source of ammonia in order for ammonia to mix in with the stream of exhaust gas. As is well known in the art, the ammonia functions as a reductant in selective catalytic reduction (SCR) processes. The ammonia can be in any suitable form, such as anhydrous ammonia, aqueous ammonia, urea, ammonium carbonate, ammonium formate, or ammonium carbamate. In some embodiments, the ammonia source is supplied continuously into the exhaust stream before and/or during the time the exhaust stream reaches the catalyst. In other embodiments, the ammonia is supplied intermittently. In other embodiments, the ammonia source is supplied before the exhaust stream reaches the catalyst. In this way, the ammonia source is first absorbed into the catalyst before reacting with the exhaust stream. Generally, an ammonia storage tank is used to contain the ammonia source.

In designing a SCR system, numerous other elements can be interconnected with the catalytic converter and ammonia source. For example, a vaporizer can be included between the ammonia source and catalytic converter for converting (i.e., decomposing) the ammonia source into ammonia gas. A mixer may also be incorporated between the ammonia source and catalytic converter (or between vaporizer and catalytic converter) to mix ammonia with the exhaust stream. Other elements, such as heaters, pumps, and fans, can be included in order to optimize the system. The SCR system can be integrated into any system that makes use of a lean burn engine, particularly those engines that use diesel fuel. The SCR system can be integrated into, for example, the engine system of a passenger vehicle, truck, utility boiler, industrial boiler, solid waste boiler (i.e., as used in the processing of municipal waste), ship, locomotive, tunnel boring machine, submarine, construction equipment, gas turbine, power plant, airplane, lawnmower, or chainsaw.

Examples have been set forth below for the purpose of illustration and to describe certain specific embodiments of the invention. However, the scope of this invention is not to be in any way limited by the examples set forth herein.

Example 1

Preparation of Cu—Fe-ZSM5 Catalyst

A Cu-ZSM-5 precursor was first prepared by impregnating H-ZSM-5 with copper (II) acetate as follows: 2.664 g of copper acetate hydrate (i.e., $Cu(OAc)_2.6H_2O$) was dissolved in 600 mL de-ionized water (0.015M), followed by addition of 10.005 g of H-ZSM-5 zeolite. The slurry was kept stirring for two hours at 50° C. Cu-ZSM-5 (blue in color) was collected by filtration after cooling, washed with de-ionized water, and calcined in the air at 500° C. (10° C./min) for four hours. The produced Cu-ZSM-5 precursor was then impregnated with iron (III) nitrate to produce Cu—Fe-ZSM-5 as follows: 5 g of Cu-ZSM-5 was suspended in a water solution of 25 mL of 0.015M $Fe(NO_3)_3$, degassed with $N_2$, and was kept stirring for two hours at 80° C. Brown solid was obtained after filtration, whilst the filtrate was clear and colorless. The product was then calcined in air at 500° C. (2° C./min) for two hours. The resulting Cu—Fe-ZSM-5 catalyst was found to contain 2.39% Cu and 0.3% Fe.

Example 2

Preparation of Cu—La-ZSM5 Catalyst

A Cu-ZSM5 precursor, produced as in Example 1, was impregnated with lanthanum nitrate to produce Cu—La-ZSM-5 as follows: 10 g Cu-ZSM-5 was suspended in a water solution of 50 mL 0.015M $La(NO_3)_3$. The slurry was heated to 85° C. for two hours, then cooled to room temperature, filtered, and washed with deionized water to provide a blue solid. The blue solid was dried at 140° C. (10° C./min) for two hours, and subsequently calcined at 500° C. (10° C./min) for two hours. The resulting Cu—La-ZSM-5 catalyst was found to contain 2.96% Cu and 0.156% La.

Example 3

Preparation of Fe—Cu—La-ZSM5 Catalyst

A Fe-ZSM5 precursor was first prepared by impregnating H-ZSM5 with iron (III) nitrate as follows: 12 g of H-ZSM-5 was suspended in a degassed 300 mL solution of 0.1 M $Fe(NO_3)_3.9H_2O$ and stirred for 24 hours at ambient temperature to produce a powder. The powder was filtered, washed, dried at 100° C. for 12 hours, and calcined at 550° C. (10° C./min) for four hours. 10 g of the produced Fe-ZSM-5 powder was then sequentially exchanged with $Cu(OAc)_2$ solution (0.015 M, 600 mL) and $La(NO_3)_3$ solution (0.15 M, 50 mL) with washing and calcination as described above. The resulting catalyst, Fe—Cu—La-ZSM-5, was further activated in a He flow at 700° C. for one hour before use. The catalyst was found to contain 2.14% Cu, 707 ppm Fe, and 848 ppm La.

Example 4

Preparation of Cu—Sc-ZSM5 Catalyst 10 g of Cu-ZSM-5 was suspended in a water solution of 50 mL of 0.030M $Sc(NO_3)_3$, and was kept stirring for two hours at 80° C. Blue solid was obtained after filtration, whilst the filtrate was clear and colorless. The product was then calcined in air at 500° C. (2° C./min) for two hours to yield a light blue powder.

Example 5

Preparation of Cu—In-ZSM5 Catalyst 10 g of Cu-ZSM-5 was suspended in a water solution of 50 mL of 0.015M $In(NO_3)_3$, and was kept stirring for two hours at 80° C. Light blue solid was obtained after filtration, whilst the filtrate was clear and colorless. The product was then calcined in air at 500° C. (2° C./min) for two hours to yield CuIn-ZSM-5, which was light blue in color. The resulting Cu—In-ZSM-5 catalyst was found to contain 2.38% Cu and 0.582% In.

Example 6

$NO_x$ Conversion Efficiencies of Produced Catalysts

General Method

Figure 1:
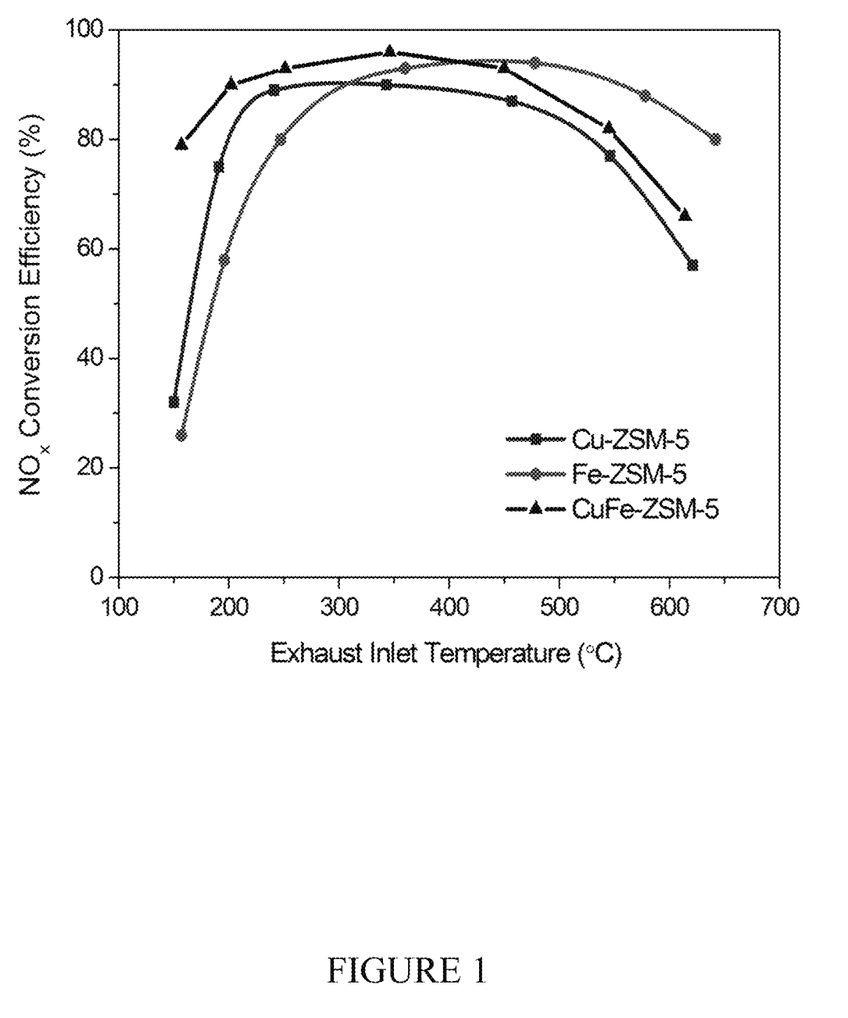
FIG. 1. Graph showing the $NO_x$ conversion efficiency of Cu—Fe-ZSM5 as compared with that of Cu-ZSM5 and Fe-ZSM5. The conversion efficiencies were tested using gas simulating exhaust from off-road diesel engines.
Figure 2:
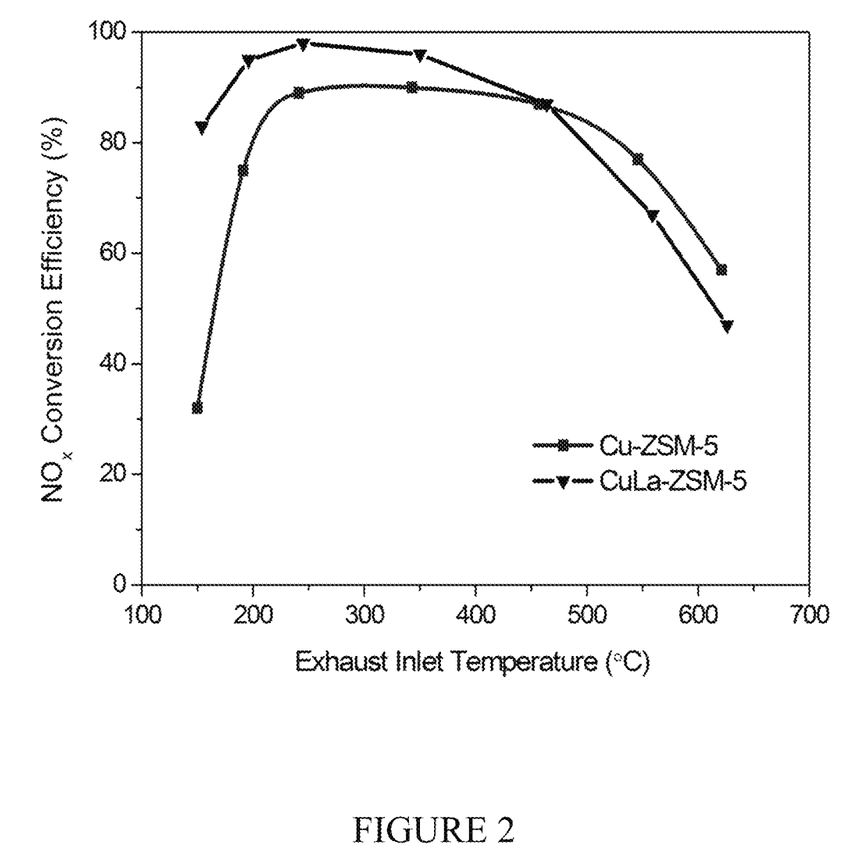
FIG. 2. Graph showing the $NO_x$ conversion efficiency of Cu—La-ZSM5 as compared with that of Cu-ZSM5. The conversion efficiencies were tested using gas simulating exhaust from off-road diesel engines.
Figure 3:
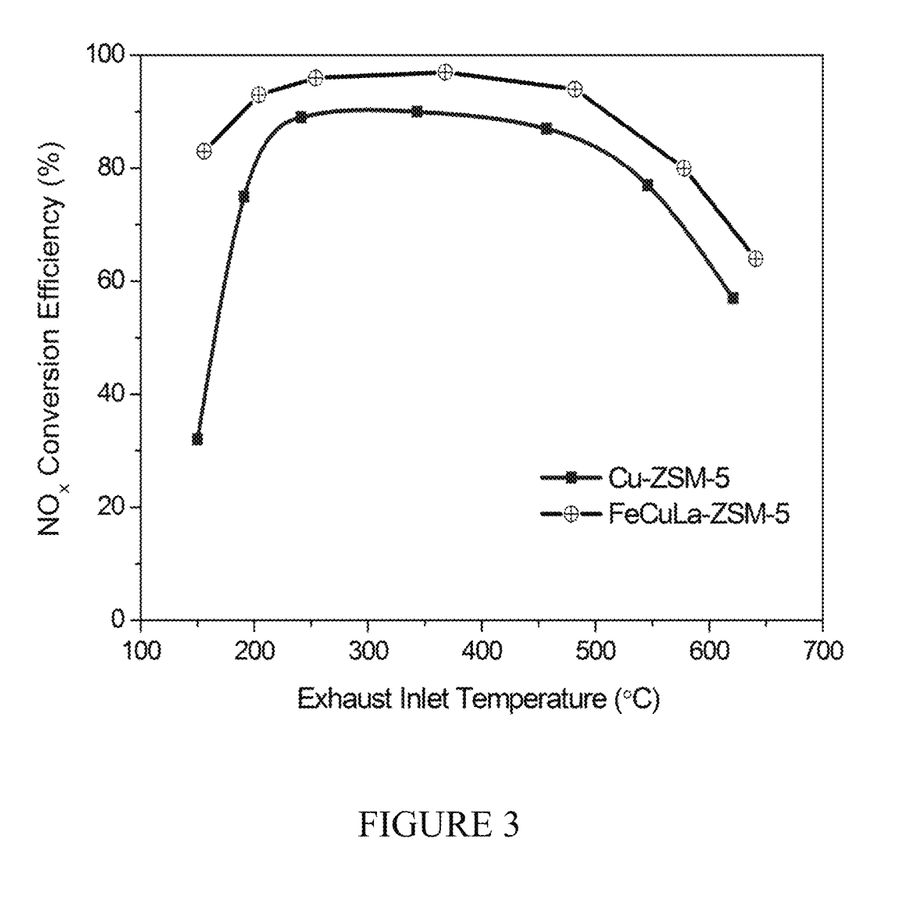
FIG. 3. Graph showing the $NO_x$ conversion efficiency of Fe—Cu—La-ZSM5 as compared with that of Cu-ZSM5. The conversion efficiencies were tested using gas simulating exhaust from off-road diesel engines.
Figure 4:
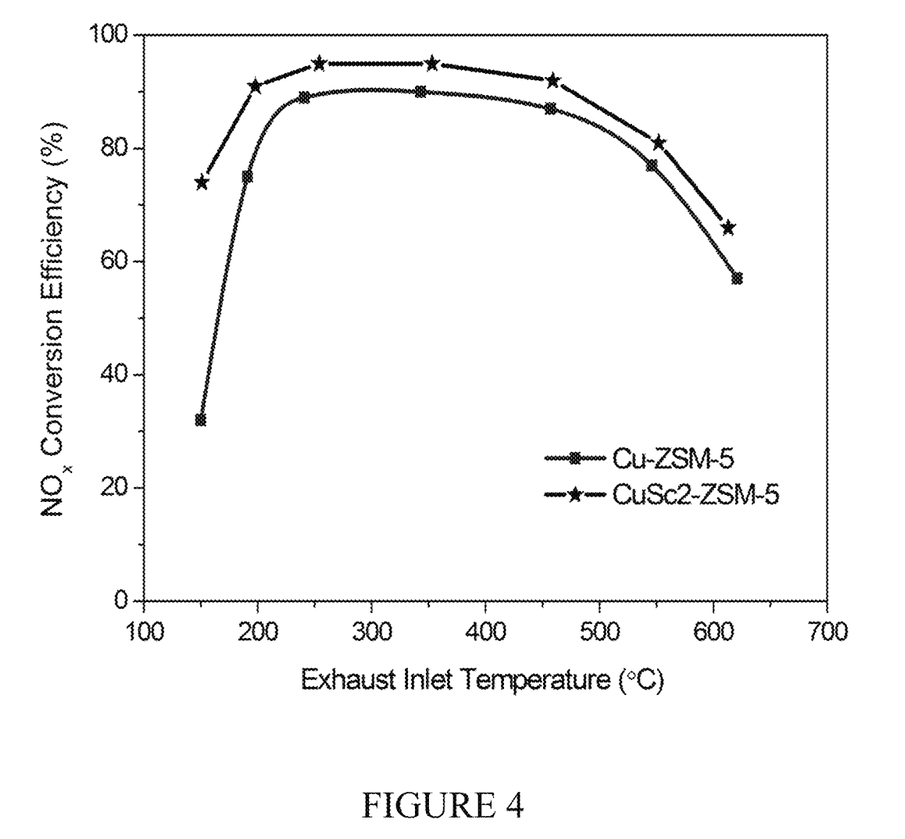
FIG. 4. Graph showing the $NO_x$ conversion efficiency of Cu—Sc-ZSM5 as compared with that of Cu-ZSM5. The conversion efficiencies were tested using gas simulating exhaust from off-road diesel engines.
Figure 5:
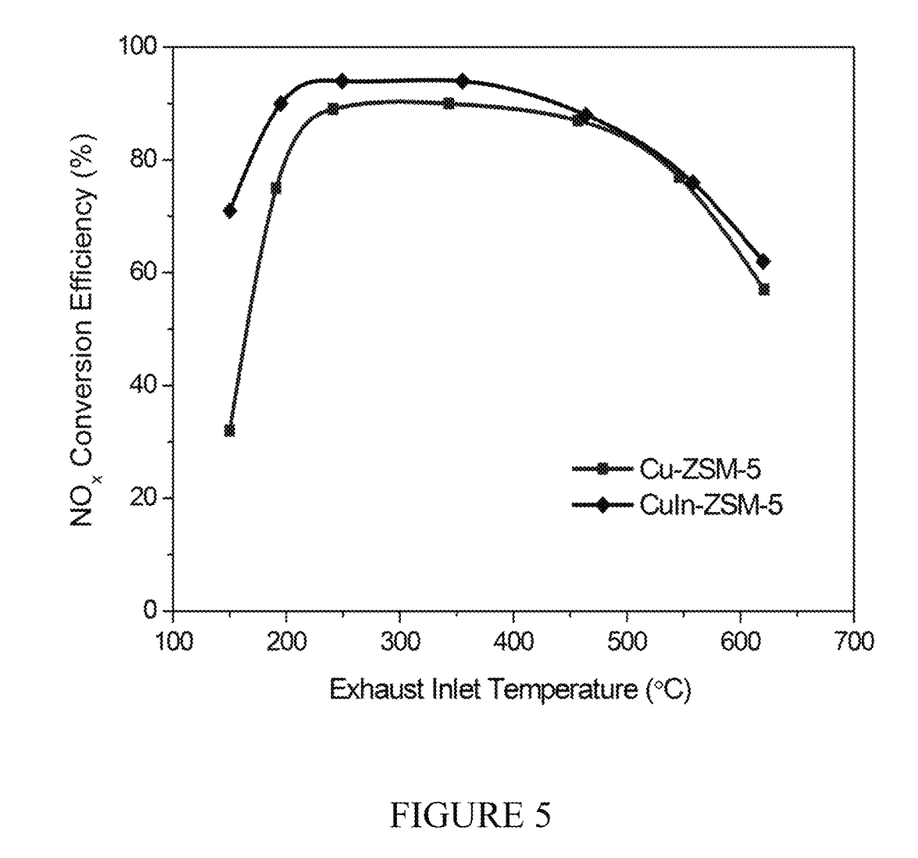
FIG. 5. Graph showing the $NO_x$ conversion efficiency of Cu—In-ZSM5 as compared with that of Cu-ZSM5. The conversion efficiencies were tested using gas simulating exhaust from off-road diesel engines.

Catalysts were degreened in a flow of 8.5% $O_2$, 8% $CO_2$, and 7.25% $H_2O$; balance $N_2$ at 600° C. at a space velocity of 50000 $h^{-1}$ for two hours. After degreening, the catalyst was loaded in the reactor as a powder and tested for its $NO_x$ conversion efficiency employing simulated exhaust of a gas mixture containing 8.5% $O_2$, 8% $CO_2$, 7.25% $H_2O$, 250 ppm $NO_2$, 250 ppm NO, 500 ppm $NH_3$, and balance $N_2$ at a space velocity of 50,000 $h^{-1}$ in a 150-650° C. temperature range.
Cu—Fe-ZSM5 Catalyst Performance As shown by FIG. 1, the Cu-ZSM-5 powder shows a $NO_x$ conversion of 30% at 150° C., which gradually improves to 80% $NO_x$ conversion at 200° C., and 90% $NO_x$ conversion at 250° C. The conversion efficiency starts to drop at 450° C. and is only 58% at 625° C. Fe-ZSM5 is a better catalyst at higher temperatures. For example, Fe-ZSM5 attains 90% $NO_x$ conversion efficiency at 350° C., which is maintained to about 550° C. The $NO_x$ conversion efficiency of Fe-ZSM5 is about 80% at 650° C. Thus, a combination of Cu-ZSM5 and Fe-ZSM5 has been employed in the prior art in an effort to provide a $NO_x$ conversion window of 250-650° C. In contrast, the Cu—Fe-ZSM catalyst produced herein exhibits a 80% $NO_x$ conversion efficiency at 150° C., maintains a 90%+ conversion efficiency from 200-500° C., at least 80% $NO_x$ conversion efficiency at 550° C., about 65% $NO_x$ conversion efficiency at 620° C., and at least 60% $NO_x$ conversion efficiency at 600° C. Thus, in contrast to Cu-ZSM-5 and Fe-ZSM-5, the Cu—Fe-ZSM-5 catalyst produced herein can efficiently convert $NO_x$ throughout the 150-650° C. range, which encompasses nearly the full range of temperatures expected in off-road diesel engine exhaust.
Cu—La-ZSM5 Catalyst Performance As shown by FIG. 2, the above-identified catalyst exhibits at least or greater than 80% $NO_x$ conversion at 150° C. and quantitative conversion at about 200° C. when tested as a powder on a bench-top reactor employing simulated exhaust. In contrast, Cu-ZSM5 exhibits only 30% $NO_x$ conversion at 150° C. and 80% $NO_x$ conversion at 200° C. Fe-ZSM5 exhibits even lower $NO_x$ conversions at these temperatures. Thus, the Cu—La-ZSM5 produced herein has been shown to be a far more effective catalyst than Cu-ZSM5 or Fe-ZSM5 on this basis alone. Furthermore, the Cu—La-ZSM5 produced herein advantageously also maintains a $NO_x$ conversion efficiency of at least 85% from about 170° C. to 475° C., or at least 90% from about 180° C. to 420° C.
Fe—Cu—La-ZSM5 Catalyst Performance As shown by FIG. 3, the above-identified catalyst retains the $NO_x$ conversion efficiency of Cu—La-ZSM5 at lower temperatures, i.e., 80% $NO_x$ conversion at 150° C. and quantitative $NO_x$ conversion at 200° C. In addition, the Fe—Cu—La-ZSM5 catalyst produced herein shows markedly improved performance at higher temperatures, i.e. quantitative $NO_x$ conversion at 500° C., 80% $NO_x$ conversion at 575° C., and 60% $NO_x$ conversion at 650° C. In comparison, the performance of Cu-ZSM5 significantly drops at these higher temperatures, i.e., exhibits about 85% $NO_x$ conversion at 500° C., no more than 70% $NO_x$ conversion at 575° C., about 60% $NO_x$ conversion at 600° C., and only about 50% $NO_x$ conversion at 650° C.
Cu—Sc-ZSM5 Catalyst Performance As shown by FIG. 4, compared to Cu-ZSM5 or Fe-ZSM5, the above-identified catalyst (equivalent to the "Cu—Sc2-ZSM5" catalyst recited in FIG. 4) exhibits a significantly improved $NO_x$ conversion efficiency at 150° C. of more than 70%. The Cu—Sc-ZSM5 catalyst produced herein also exhibits a significantly improved $NO_x$ conversion efficiency at 200° C. of about or greater than 90%. Furthermore, the Cu—Sc-ZSM5 catalyst produced herein also exhibits an improved $NO_x$ conversion efficiency of at least 80% from 170° C. to 550° C., or a $NO_x$ conversion efficiency of at least 85% from 180° C. to 510° C., or a $NO_x$ conversion efficiency of at least 90% from 200° C. to 475° C.
Cu—In-ZSM5 Catalyst Performance As shown by FIG. 5, compared to Cu-ZSM5 or Fe-ZSM5, the above-identified catalyst exhibits a significantly improved $NO_x$ conversion efficiency at 150° C. of at least 70%. The Cu—In-ZSM5 catalyst produced herein also exhibits a significantly improved $NO_x$ conversion efficiency at 200° C. of about 85%. Furthermore, the Cu—In-ZSM5 catalyst produced herein also exhibits an improved $NO_x$ conversion efficiency of at least 80% from 175° C. to 530° C., or a $NO_x$ conversion efficiency of at least 85% from 180° C. to 490° C., or a $NO_x$ conversion efficiency of at least 90% from 200° C. to 430° C.

Example 7

Temperature Programmed Desorption (TPD) Experiments

Figure 6:
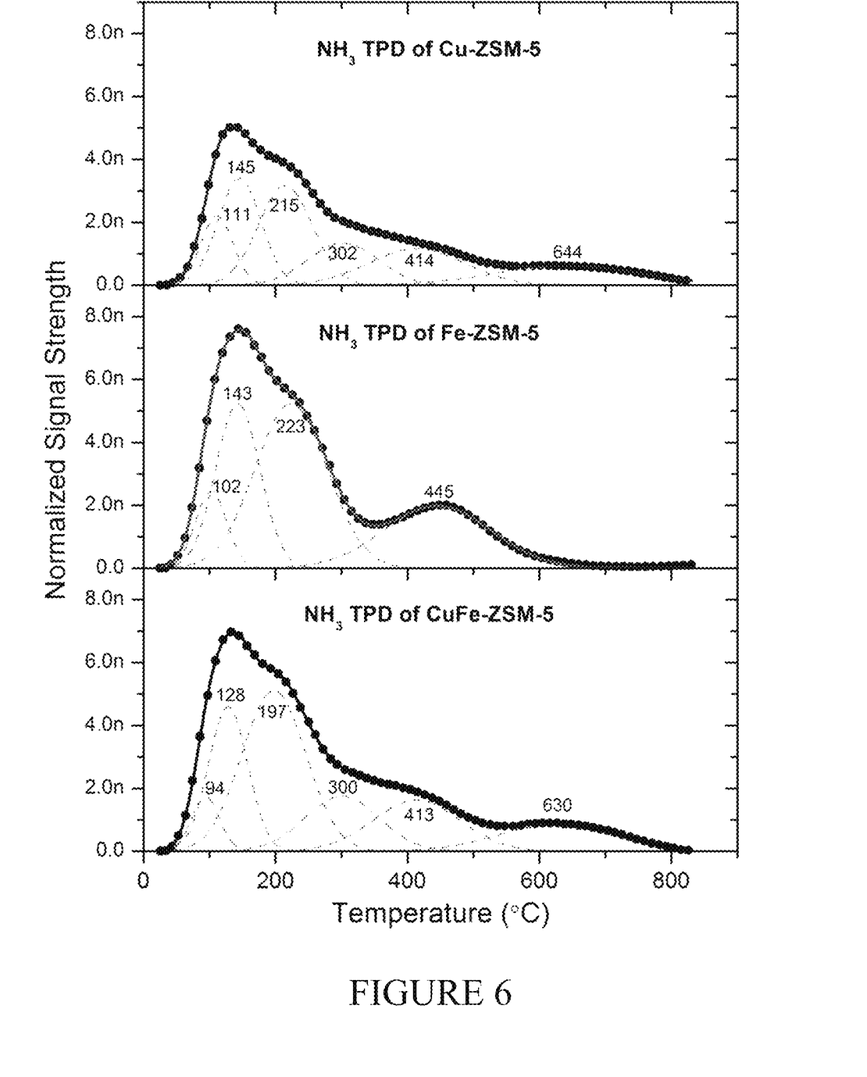
FIG. 6. Graphs showing the results of temperature programmed desorption (TPD) experiments on Cu-ZSM5, Fe-ZSM5, and Cu—Fe-ZSM5 catalysts.

The temperature programmed desorption (TPD) experiments were performed by the following standard protocol. Zeolite samples were dried at 250° C. under a flow of He for one hour followed by evacuation at 400° C. for 12 hours. The samples were then exposed to $NH_3$ at 25° C. and 760 mm Hg. A helium flow was introduced to remove free $NH_3$ from the analysis cell. After one hour, a linear temperature ramping on the analysis cell from 25° C. to 830° C. was carried out and $NH_3$ desorption was carefully monitored. As shown by FIG. 6, the ammonia TPD of Cu-ZSM-5 shows broad peaks centered at 145, 215, 302, and 405° C. and that of Fe-ZSM-5 shows broad peaks centered at 143, 223, and 445° C. While the TPD of Cu—Fe-ZSM-5 is similar in many respects to that of Cu-ZSM-5, it is significant that the $NH_3$ desorption peaks for Cu—Fe-ZSM5 are shifted to lower temperatures. This shift to lower temperatures indicates an electron rich element (i.e. Fe) in the vicinity of Cu.

While there have been shown and described what are at present considered the preferred embodiments of the invention, those skilled in the art may make various changes and modifications which remain within the scope of the invention defined by the appended claims.

What is claimed is:

1. A catalyst comprising a pentasil-containing zeolite loaded with copper ions and at least one trivalent metal ion other than $Al^{+3}$, wherein said copper ions are present in said catalyst in a loading amount of at least 1 wt % and said at least one trivalent metal ion other than $Al^{3+}$ is present in said catalyst in a loading amount of less than 1 wt %, and said copper and trivalent metal ion loading amounts are effective to achieve a $NO_x$ conversion at 150° C. of at least 50% in the presence of an ammonia reductant.

2. The catalyst of claim 1, wherein said at least one trivalent metal ion is selected from trivalent transition metal ions.

3. The catalyst of claim 2, wherein said trivalent transition metal ions are selected from $Sc^{+3}$, $Y^{+3}$, $V^{+3}$, $Nb^{+3}$, $Cr^{+3}$, $Fe^{+3}$, and $Co^{+3}$.

4. The catalyst of claim 1, wherein said at least one trivalent metal ion is selected from trivalent main group metal ions.

5. The catalyst of claim 4, wherein said trivalent main group metal ions are selected from $Ga^{+3}$, $In^{+3}$, $As^{+3}$, $Sb^{+3}$, and $Bi^{+3}$.

6. The catalyst of claim 1, wherein said at least one trivalent metal ion is selected from trivalent lanthanide metal ions selected from $La^{+3}$, $Ce^{+3}$, $Pr^{+3}$, $Nd^{+3}$, $Sm^{+3}$, $Eu^{+3}$, $Gd^{+3}$, $Tb^{+3}$, $Dy^{+3}$, $Ho^{+3}$, $Er^{+3}$, $Yb^{+3}$, and $Lu^{+3}$.

7. The catalyst of claim 6, wherein said trivalent lanthanide metal ions are selected from $La^{+3}$, $Ce^{+3}$, $Pr^{+3}$, and $Nd^{+3}$.

8. The catalyst of claim 1, wherein said at least one trivalent metal ion is selected from $Fe^{+3}$, $In^{+3}$, $Sc^{+3}$, and $La^{+3}$.

9. The catalyst of claim 1, wherein said at least one trivalent metal ion is a combination of at least two trivalent metal ions.

10. The catalyst of claim 9, wherein said at least two trivalent metal ions are selected from trivalent transition metal ions.

11. The catalyst of claim 9, wherein at least one trivalent metal ion is a trivalent transition metal ion and at least one trivalent metal ion is a trivalent lanthanide metal ion.

12. The catalyst of claim 9, wherein at least one trivalent metal ion is a trivalent transition metal ion and at least one trivalent metal ion is a trivalent main group metal ion.

13. The catalyst of claim 9, wherein at least one trivalent metal ion is a trivalent main group metal ion and at least one trivalent metal ion is a trivalent lanthanide metal ion.

14. The catalyst of claim 1, wherein said zeolite is ZSM-5.

15. The catalyst of claim 1, wherein said catalyst exhibits a $NO_x$ conversion at 150° C. of at least 60%.

16. The catalyst of claim 15, wherein said catalyst also exhibits a $NO_x$ conversion at 200° C. of at least 80%.

17. The catalyst of claim 15, wherein said catalyst also exhibits a $NO_x$ conversion at 600° C. of a least 60%.

18. A catalytic converter comprising a catalyst loaded onto a refractory substrate, said catalyst comprising a pentasil-containing zeolite loaded with copper ions and at least one trivalent metal ion other than $Al^{+3}$, wherein said copper ions are present in said catalyst in a loading amount of at least 1 wt % and said at least one trivalent metal ion other than $Al^{3+}$ is present in said catalyst in a loading amount of less than 1 wt %, and said copper and trivalent metal ion loading amounts are effective to achieve a $NO_x$ conversion at 150° C. of at least 50% in the presence of an ammonia reductant.

19. The catalytic converter of claim 18, wherein said at least one trivalent metal ion is selected from trivalent transition metal ions.

20. The catalytic converter of claim 19, wherein said trivalent transition metal ions are selected from $Sc^{+3}$, $Y^{+3}$, $V^{+3}$, $Nb^{+3}$, $Cr^{+3}$, $Fe^{+3}$, and $Co^{+3}$.

21. The catalytic converter of claim 18, wherein said at least one trivalent metal ion is selected from trivalent main group metal ions.

22. The catalytic converter of claim 21, wherein said trivalent main group metal ions are selected from $Ga^{+3}$, $In^{+3}$, $As^{+3}$, $Sb^{+3}$, and $Bi^{+3}$.

23. The catalytic converter of claim 18, wherein said at least one trivalent metal ion is selected from trivalent lanthanide metal ions selected from $La^{+3}$, $Ce^{+3}$, $Pr^{+3}$, $Nd^{+3}$, $Sm^{+3}$, $Eu^{+3}$, $Gd^{+3}$, $Tb^{+3}$, $Dy^{+3}$, $Ho^{+3}$, $Er^{+3}$, $Tm^{+3}$, $Yb^{+3}$, and $Lu^{+3}$.

24. The catalytic converter of claim 23, wherein said trivalent lanthanide metal ions are selected from $La^{+3}$, $Ce^{+3}$, $Pr^{+3}$, and $Nd^{+3}$.

25. The catalytic converter of claim 18, wherein said at least one trivalent metal ion is selected from $Fe^{+3}$, $In^{+3}$, $Sc^{+3}$, and $La^{+3}$.

26. The catalytic converter of claim 18, wherein said at least one trivalent metal ion is a combination of at least two trivalent metal ions.

27. The catalytic converter of claim 26, wherein said at least two trivalent metal ions are selected from trivalent transition metal ions.

28. The catalytic converter of claim 26, wherein at least one trivalent metal ion is a trivalent transition metal ion and at least one trivalent metal ion is a trivalent lanthanide metal ion.

29. The catalytic converter of claim 26, wherein at least one trivalent metal ion is a trivalent transition metal ion and at least one trivalent metal ion is a trivalent main group metal ion.

30. The catalytic converter of claim 26, wherein at least one trivalent metal ion is a trivalent main group metal ion and at least one trivalent metal ion is a trivalent lanthanide metal ion.

31. The catalytic converter of claim 18, wherein said zeolite is ZSM-5.

32. The catalytic converter of claim 18, wherein said catalyst exhibits a $NO_x$ conversion at 150° C. of at least 60%.

33. The catalytic converter of claim 32, wherein said catalyst exhibits a $NO_x$ conversion at 200° C. of at least 80%.

34. The catalytic converter of claim 32, wherein said catalyst exhibits a $NO_x$ conversion at 600° C. of at least 60%.

35. The catalytic converter of claim 18, wherein said refractory substrate is a honeycomb structure.

36. The catalyst of claim 1, wherein said copper ions are present in said catalyst in a loading amount of at least 1.5 wt % and said at least one trivalent metal ion is present in said catalyst in a loading amount of less than 1 wt %.

37. The catalyst of claim 1, wherein said copper ions are present in said catalyst in a loading amount of at least 2 wt % and said at least one trivalent metal ion is present in said catalyst in a loading amount of less than 1 wt %.

* * * * *